(12) United States Patent
Saliva et al.

(10) Patent No.: US 12,261,535 B2
(45) Date of Patent: Mar. 25, 2025

(54) ISOLATED POWER CONVERTER HAVING A VOLTAGE SUPPLY CIRCUIT

(71) Applicant: Infineon Technologies Austria AG, Villach (AT)

(72) Inventors: Allan Saliva, Milpitas, CA (US); Roderick Domingo, Hayward, CA (US)

(73) Assignee: Infineon Technologies Austria AG, Villach (AT)

( * ) Notice: Subject to any disclaimer, the term of this patent is extended or adjusted under 35 U.S.C. 154(b) by 352 days.

(21) Appl. No.: 17/893,449

(22) Filed: Aug. 23, 2022

(65) Prior Publication Data
US 2024/0072674 A1 Feb. 29, 2024

(51) Int. Cl.
*H02M 3/335* (2006.01)
*H02M 3/00* (2006.01)

(52) U.S. Cl.
CPC ......... *H02M 3/33571* (2021.05); *H02M 3/01* (2021.05)

(58) Field of Classification Search
CPC .......... H02M 3/01; H02M 3/015; H02M 3/06; H02M 3/33571; H02M 3/33573; H02M 3/33569; H02M 3/33561; H02M 3/337; H02M 3/3372; H02M 3/3376; H02M 3/3378

See application file for complete search history.

(56) References Cited

U.S. PATENT DOCUMENTS

| | | | |
|---|---|---|---|
| 9,601,982 B1 | 3/2017 | Zhang et al. | |
| 10,418,906 B2 | 9/2019 | Yang | |
| 11,139,741 B2 | 10/2021 | Medina-Garcia et al. | |
| 2006/0239041 A1* | 10/2006 | Schonleitner | H02M 3/33507 363/21.07 |
| 2018/0294668 A1* | 10/2018 | Li | H02J 9/005 |
| 2024/0072673 A1* | 2/2024 | Sigamani | H02M 3/33573 |

OTHER PUBLICATIONS

Medina-Garcia, Alfredo, et al., "Resonant Hybrid Flyback, a New Topology for High Density Power Adaptors", Electronics 2018, 7, 363, Dec. 1, 2018, pp. 1-12.

* cited by examiner

*Primary Examiner* — Nguyen Tran
(74) *Attorney, Agent, or Firm* — Murphy, Bilak & Homiller, PLLC

(57) ABSTRACT

An isolated power converter includes: a transformer having primary winding and first and second auxiliary windings on the primary side; a converter stage configured to convert a DC input for driving the primary winding and having a resonant capacitor electrically connected to the primary winding; a controller configured to control switching of the converter stage; and a voltage supply circuit configured to select a first voltage as a supply voltage for the controller if a voltage proportional to a secondary side voltage of the transformer is at a first level or select a second voltage as the supply voltage if the voltage proportional to the secondary side voltage is at a second level greater than the first level. The first voltage corresponds to a summation of voltages across the first auxiliary winding and the resonant capacitor. The second voltage corresponds to a voltage across the second auxiliary winding.

20 Claims, 6 Drawing Sheets

ISOLATED POWER CONVERTER HAVING A VOLTAGE SUPPLY CIRCUIT

BACKGROUND

Power adapters are typically designed to charge or supply multiple types of electronic devices such as laptop computers, tablets, mobile devices, etc. This requires a wide output voltage range, e.g., 3.3V to 20V in the case of the USB-PD (USB power delivery) specification. Other electronic devices such as smart speakers, sound bars, etc. can be powered using a USB-PD type adapter and usually require a higher voltage, e.g., around 24V. In the case of USB-PD as the power supply, the output voltage range must be extended up to 24V. Similar wide output voltage power supply requirements can be found in LED (light emitting diode) lighting power supply applications where a variable LED load can be connected.

The input voltage for USB-PD power adapters is usually in the range of 90 Vac to 264 Vac, where the flyback derived topology is widely used because of its inherent wide operating input and output voltage range. Examples of flyback variants used in USB-PD power adapters include fixed frequency/QR (quasi-resonant) flyback and the more efficient ZVS (zero-voltage switching) variant such as the active clamp flyback (ACF) and asymmetrical half bridge flyback.

Regardless of the topology, an auxiliary voltage must be generated to bias the controller on the primary side of the power adapter. Auxiliary/self-supply is an important aspect of the adapter design, since the auxiliary/self-supply affects multiple aspects of power supply operation such as start-up, standby power, and efficiency. Average efficiency specifications based on different regulation (e.g., DOE6 and COC v5 Tier2) must be met for every output voltage. Full load efficiency for the highest output power also is important for power density and thermal requirements. In addition, efficiency requirements for light-load conditions (e.g., 1 W, 1.5 W, etc.) must be met for every output voltage.

Thus, there is a need for an improved self-supply method for power adapters having a wide input voltage range (e.g., 90 Vac to 264 Vac) and a wide output voltage range (e.g., 3.3V to 24V).

SUMMARY

According to an embodiment of an isolated power converter, the isolated power converter comprises: a transformer comprising a primary winding, a first auxiliary winding, and a second auxiliary winding each on a primary side of the transformer; a converter stage configured to convert a DC input for driving the primary winding of the transformer, the converter stage comprising a resonant capacitor electrically connected to the primary winding; a controller configured to control switching of the converter stage; and a voltage supply circuit configured to select a first voltage as a supply voltage for the controller if a voltage proportional to a secondary side voltage of the transformer is at a first level or select a second voltage as the supply voltage if the voltage proportional to the secondary side voltage is at a second level greater than the first level, wherein the first voltage corresponds to a summation of a voltage across the first auxiliary winding and a voltage across the resonant capacitor, wherein the second voltage corresponds to a voltage across the second auxiliary winding.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a self-supply method for power adapters having a wide input voltage range (e.g., 90 Vac to 264 Vac) and a wide output voltage range (e.g., 3.3V to 24V). For isolated power converters that use a transformer, the self-supply method is implemented using auxiliary windings on the primary side of the transformer and a resonant capacitor electrically connected to the primary winding. The self-supply method enables efficient power supply design for wide output voltage range and allows the use of cost-optimized components.

Described next, with reference to the figures, are exemplary embodiments of an isolated power converter that implements the self-supply.

Figure 1:
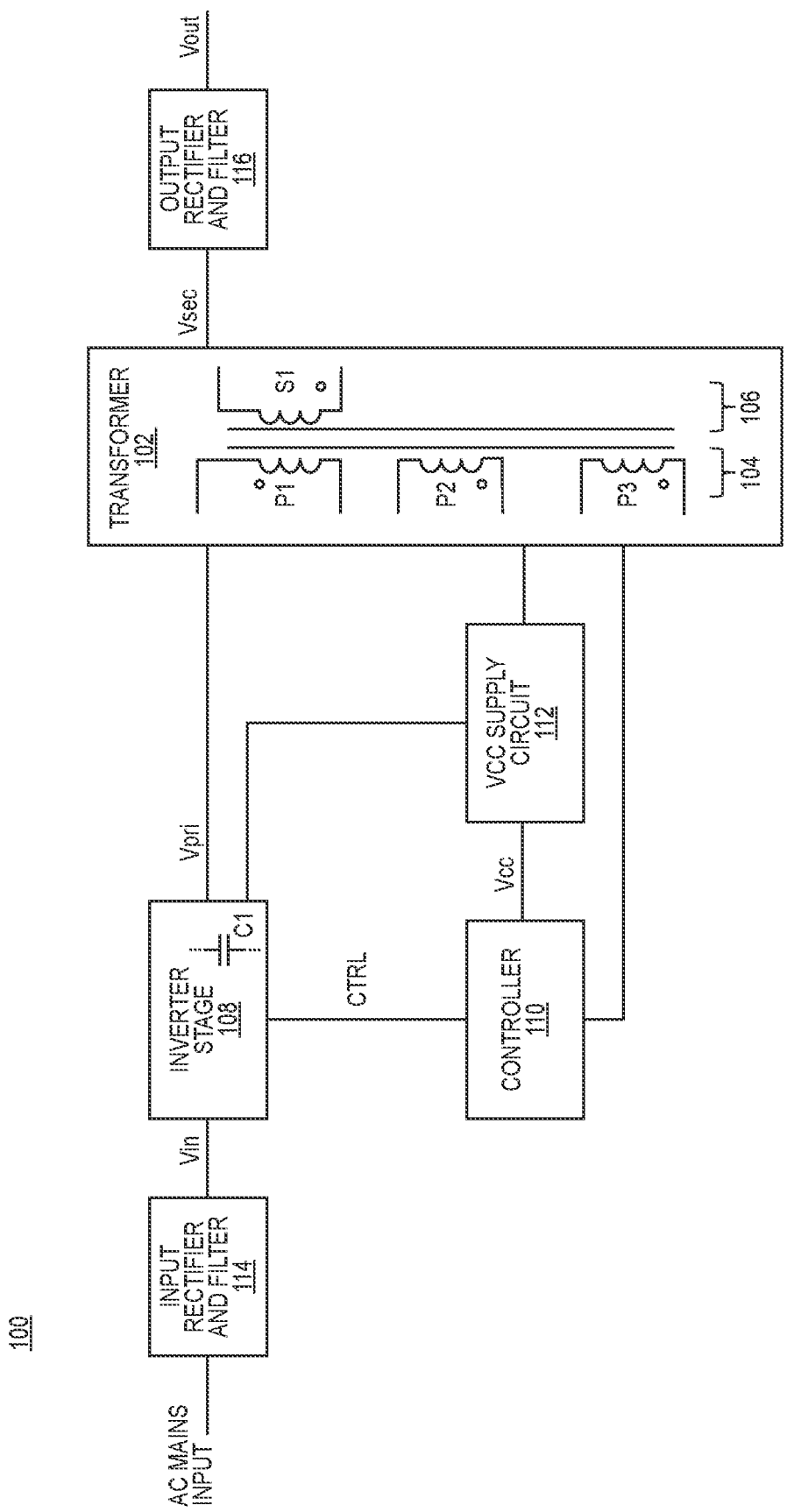
FIG. 1 illustrates a schematic diagram of an embodiment of an isolated power converter.

FIG. 1 illustrates an embodiment of an (galvanically) isolated power converter 100. The isolated power converter 100 includes a transformer 102 having a primary ('pri') winding P1, a first auxiliary winding P2, and a second ('sec') auxiliary winding P3 each on the primary (input) side 104 of the transformer 102. The transformer 102 of the isolated power converter 100 also has a secondary winding S1 on the secondary (output) side 106 of the transformer 102.

The isolated power converter 100 also includes a converter stage that converts a DC input 'Vin' to an AC voltage 'Vpri' for driving the primary winding P1 of the transformer 102. The converter stage 108 includes a resonant capacitor 'C1' electrically connected to the primary winding P1 of the transformer 102.

The isolated power converter 100 also includes a controller 110 to control switching of the converter stage 108. For example, the controller 110 may generate a signal 'CTRL' that controls when the converter stage 108 drives the primary winding P1 of the transformer 102 with the AC voltage Vpri and when the converter stage 108 does not drive the primary winding P1, e.g., to meet an output voltage regulation target.

The isolated power converter 100 also includes a voltage supply circuit 112 that provides a supply voltage A/cc' to the controller 110 so that the controller 110 is 'self-powered'. The voltage supply circuit 112 selects a first voltage 'Vcc1' as the supply voltage Vcc for the controller 110 if a voltage proportional to the secondary side voltage A/sec' of the transformer 102 is at a first level. The voltage supply circuit 112 selects a second voltage 'Vcc2' as the supply voltage Vcc for the controller 110 if the voltage proportional to the secondary side voltage Vsec is at a second level greater than the first level. The first voltage Vcc1 corresponds to a summation of a voltage 'VP2' across the first auxiliary winding P2 of the transformer 102 and a voltage VC1' across the resonant capacitor C1 of the converter stage 108. The second voltage Vcc2 corresponds to a voltage 'VP3' across the second auxiliary winding P3 of the transformer 102. In one embodiment, the first voltage Vcc1 is in a range of 3.3V to 9V and the second voltage Vcc2 is in a range of 10V to 24V.

The isolated power converter 100 also may include an input rectifier and filter circuit 114 that generates the DC input voltage Vin to the converter stage 108 from AC mains. The isolated power converter 100 also may include an output rectifier and filter circuit 116 that generates a DC output voltage 'Vout' derived from the secondary side voltage Vsec of the transformer 102. The input rectifier and filter circuit 114 and the output rectifier and filter circuit 116 may include a diode rectifier or a synchronous rectifier. For example, the DC input voltage Vin to the converter stage 108 may come from a full wave rectifier circuit used to convert the AC mains input, e.g., from 90V to 264 Vac into a rectified dc voltage Vin.

Figure 2:
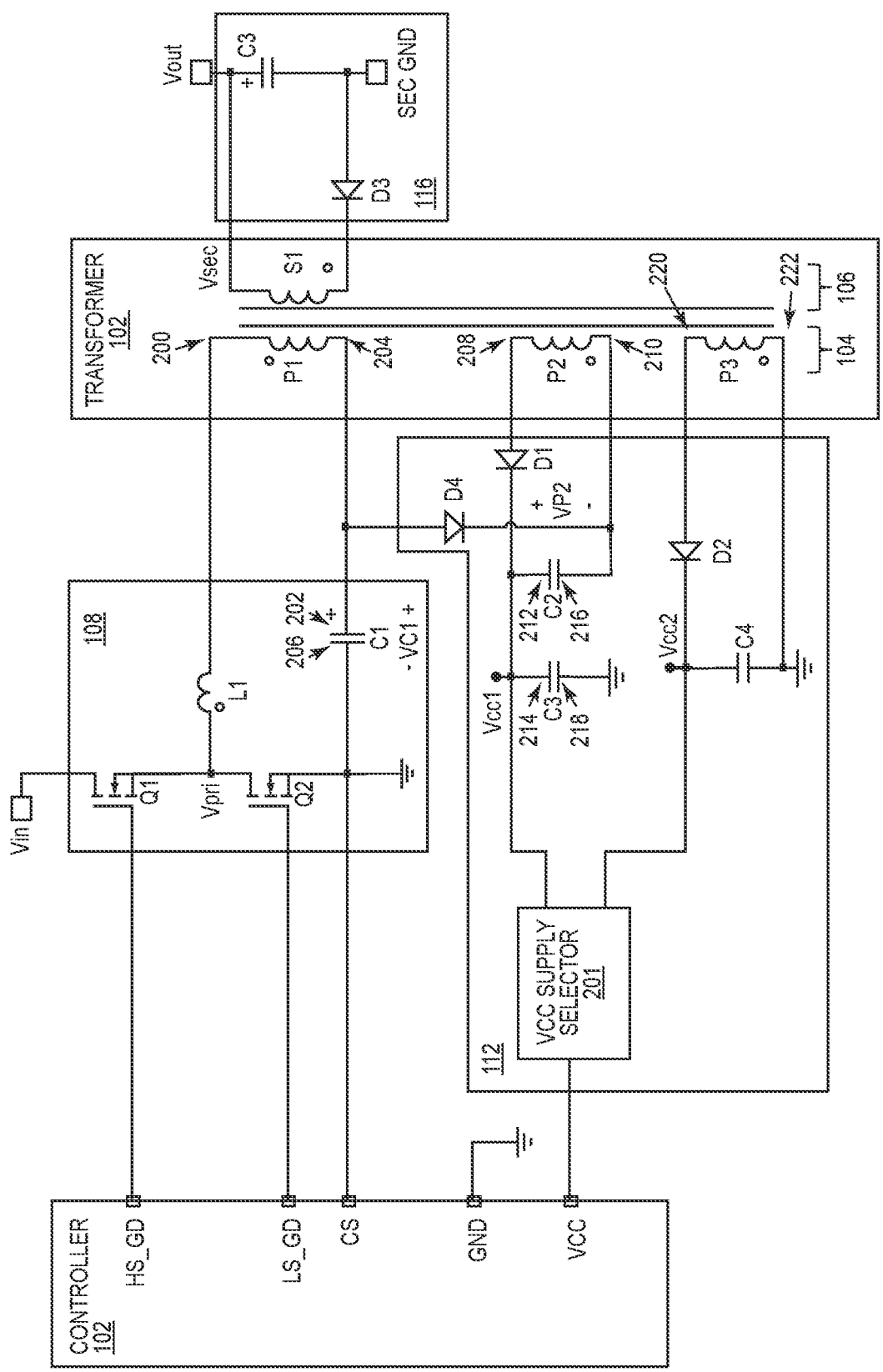
FIGS. 2 through 6 illustrate embodiments of a voltage supply circuit included in the isolated power converter.

FIG. 2 illustrates an embodiment of the voltage supply circuit 112 of the isolated power converter 100. According to this embodiment, the converter stage 108 is implemented as a resonant flyback stage having a high-side switch Q1 such as a power MOSFET (metal-oxide semiconductor field-effect transistor), a low-side switch Q2 such as a power MOSFET, and a resonant tank circuit. The high-side switch Q1 and the low-side switch Q2 are connected in series between the DC input Vin and ground 'GND' in a half bridge configuration.

The controller 102 drives the gate of the high-side switch Q1 with a first signal 'HS_GD' and the gate of the low-side switch Q2 with a second signal 'LS_GD'. The controller 102 generates the gate signals HS_GD, LS_GD so that the high-side and low-side switches Q1, Q2 are not turned on at the same time. The controller 102 adjusts the duty cycle of the gate signals HS_GD, LS_GD to maintain regulation of the output voltage Vout at capacitor C3 on the secondary side of the isolated power converter 100.

The resonant tank circuit of the voltage supply circuit 112 includes the resonant capacitor C1 and an inductor L1. The inductor L1 electrically connects the switching node Vpri between the high-side switch and the low-side switch of the half bridge to a first terminal 200 of the primary winding P1 of the transformer 102. The inductor L1 may be embodied as an external inductor. In another example, the leakage inductance of the transformer 102 may be used as the resonant inductor L1. A first terminal 202 of the resonant capacitor C1 is electrically connected to a second terminal 204 of the primary winding P1. A second terminal 206 of the resonant capacitor C1 is grounded. The controller 102 has a sense terminal 'CS' electrically coupled to the grounded terminal 206 of the resonant capacitor C1.

The voltage supply circuit 112 includes a first smoothing capacitor C2, a second smoothing capacitor C3, a first diode D1, and a voltage supply selector 201. The anode of the first diode D1 is electrically connected to a first terminal 208 of the first auxiliary winding P2. The cathode of the first diode D1 is electrically connected to an input of the voltage supply selector 201.

The first terminal 202 of the resonant capacitor C1 is electrically connected to both a second terminal 210 of the first auxiliary winding P2 and the second terminal 204 of the primary winding P1. Both a first terminal 212 of the first smoothing capacitor C2 and a first terminal 214 of the second smoothing capacitor C3 are electrically connected to the cathode of the first diode D1. A second terminal 216 of the first smoothing capacitor C2 is electrically connected to the second terminal 210 of the first auxiliary winding P2 and the second terminal 218 of the second smoothing capacitor C3 is grounded.

A first terminal 220 of the second auxiliary winding P3 is electrically connected to an input of the voltage supply selector 201 through a diode D2 of the voltage supply circuit 112. A capacitor C4 of the voltage supply circuit 112 is electrically connected between the cathode of this diode D2 and a second terminal 222 of the second auxiliary winding P3.

The voltage supply circuit 112 provides the supply voltage Vcc to the controller 110 over a wide output voltage variation, e.g., from a minimum of 3.3V to a maximum of 24V, via a combination of the auxiliary primary windings P2, P3 and the resonant capacitor C1. The voltage across the second auxiliary winding P3 located on the primary side is in phase with the voltage across the secondary winding S1 and provides energy while switch Q2 is on, and produces the second voltage Vcc2 which is equal to the output voltage Vout multiplied by the turn ratio between the secondary winding S1 and the second auxiliary winding P3 as given by:

$$Vcc2 = Vout * (Ns/Np3) \quad (1)$$

where Ns is the number of turns for the secondary winding S1 and Np3 is the number of turns for the second auxiliary winding P3.

For higher output voltages, e.g., in the range of 10V to 24V, the voltage supply selector 201 selects the second voltage Vcc2 as the supply voltage input Vcc to the controller 110. The first voltage Vcc1 decreases with the output voltage Vout and at some point, Vcc1 becomes insufficient to adequately power the controller 110. The voltage supply selector 201 selects the second voltage Vcc2 as the supply voltage input Vcc to the controller 110 under these conditions, to ensure the controller 110 is adequately supplied for lower output voltages, e.g., in the range of 3.3V to 9V.

The first voltage Vcc1 is generated by combining the voltage VP2 across the first auxiliary winding P2 and the voltage VC1 across the resonant capacitor C1, using diodes D1 and D2 and smoothing capacitors C2 and C3. Using just the voltage VC1 across the resonant capacitor C1 to supply the controller 102 over a wide output voltage range such as 3.3V to 24V would be insufficient because this voltage is proportional to the output Vout and the turn ratio between the first auxiliary winding P2 and the secondary winding S1. Increasing the turn ratio may be viable alternative to increase the voltage VC1 across the resonant capacitor C1, but this option is limited due to the minimum input voltage and voltage stress in the secondary side rectification device D3.

Figure 3:
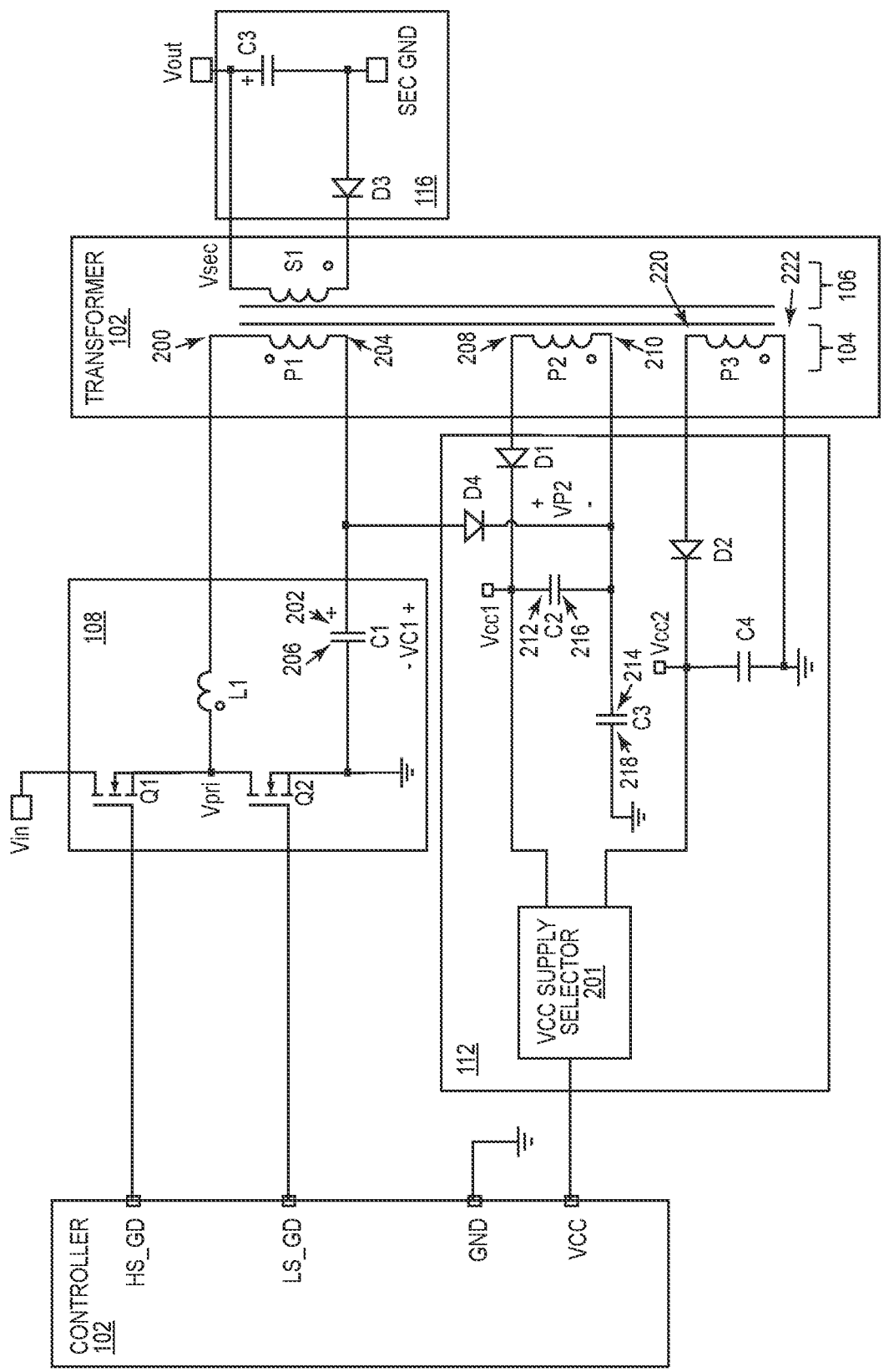

FIG. 3 illustrates another embodiment of the voltage supply circuit 112 of the isolated power converter 100. The embodiment shown in FIG. 3 is similar to the embodiment shown in FIG. 2. In FIG. 3, the voltage supply circuit 112 also includes an additional diode D4 having an anode electrically connected to the second terminal 204 of the primary winding P1 and a cathode electrically connected to the second terminal 210 of the first auxiliary winding P2. Also, the first terminal 214 of the second smoothing capacitor C3 is electrically connected to the second terminal 210 of the first auxiliary winding P2.

The voltage VC1 on the resonant capacitor C1 is coupled to the second smoothing capacitor C3 through diode D4. Diode D4 also blocks the auxiliary circuit current from going into the resonant capacitor C1 so as not to effect resonant tank circuit operation. The first auxiliary winding P2 located on the primary side is in phase with the secondary winding S1 and provides energy while switch Q2 is on, and produces a voltage VP2 proportional to the output voltage Vout. The second terminal 210 of the first auxiliary winding P2 is connected to the first (positive) terminal 214 of the second capacitor C3, in which its voltage is the same as the resonant capacitor C1, while the other terminal 208 of the first auxiliary winding P2 is connected to the anode of diode D1. By connecting the first auxiliary winding P2 in this way, the voltage from the resonant capacitor C1 is utilized in addition to the voltage generated from the first auxiliary winding P2. This voltage Vcc1 is the sum up across the smoothing capacitors C2 and C3 which is then selected by the voltage supply selector 201 to supply the controller 102 for lower output voltages, e.g., in the range of 3.3V to 9V.

The self-supply method shown in both FIG. 2 and FIG. 3 for the controller 102 reduces the number of turns of the first auxiliary P2 winding, since the first auxiliary P2 winding is used to supplement the voltage on the resonant capacitor C1 for lower output voltages, e.g., in the range of 3.3V to 9V. This allows the flyback converter to work over a very wide range, with the voltage supply selector 201 selecting the second voltage Vcc2 as the controller supply voltage Vcc for higher output voltages, e.g., in the range of 10V to 24V and selecting the first voltage Vcc1 as the controller supply voltage Vcc for lower output voltages, e.g., in the range of 3.3V to 9V.

For example, using the asymmetrical half bridge flyback converter shown in FIG. 2 or FIG. 3 with a universal ac mains input and an output voltage of 5V to 24V, the turn ratio Ns/Np2 is less than 2.4, e.g., 22/10. This turn ratio produces about 11V across the resonant capacitor C1 at the minimum output voltage which is not high enough to reliably supply the controller 102 if the controller 102 requires, e.g., a 12V supply voltage. The turn ratio could be increased to 2.4 or even slightly higher to reliably power the controller 102 at the minimum output voltage. However, at a maximum output voltage of 24V, the duty cycle of the controller 102 would saturate, especially if a smaller bulk capacitor is used. By adding the first auxiliary winding P2 as shown in FIGS. 2 and 3, only 4 turns are needed on P2 to produce 13V (11V+2V) which is an adequate Vcc bias voltage for the controller 102 in this example.

The significantly smaller number of turns for the first auxiliary winding P2 (e.g., 4 turns) significantly reduces the voltage rating of rectifier diode D1 and the first smoothing capacitor C2. For the example given above, this results in a voltage stress of about 67V (264*1.414/(22/4)) for rectifier diode D1 as compared to (264*1.414/(22/26))~441V using conventional two winding solutions. Accordingly, the rectifier diode D1 may have a rated voltage of at most 100V instead of 600V. The same advantage also applies for the first smoothing capacitor C2, because of the smaller number of turns for the first auxiliary winding P2 and how the first smoothing capacitor C2 is connected in FIGS. 2 and 3. Accordingly, the first smoothing capacitor C2 may have a rated voltage of less than 100V. For example, the first smoothing capacitor C2 for the first auxiliary winding P2 would only need to be rated for 25V instead of 100V for the example given above. This lower voltage rating advantage translates to a smaller package size and reduced cost.

Figure 4:
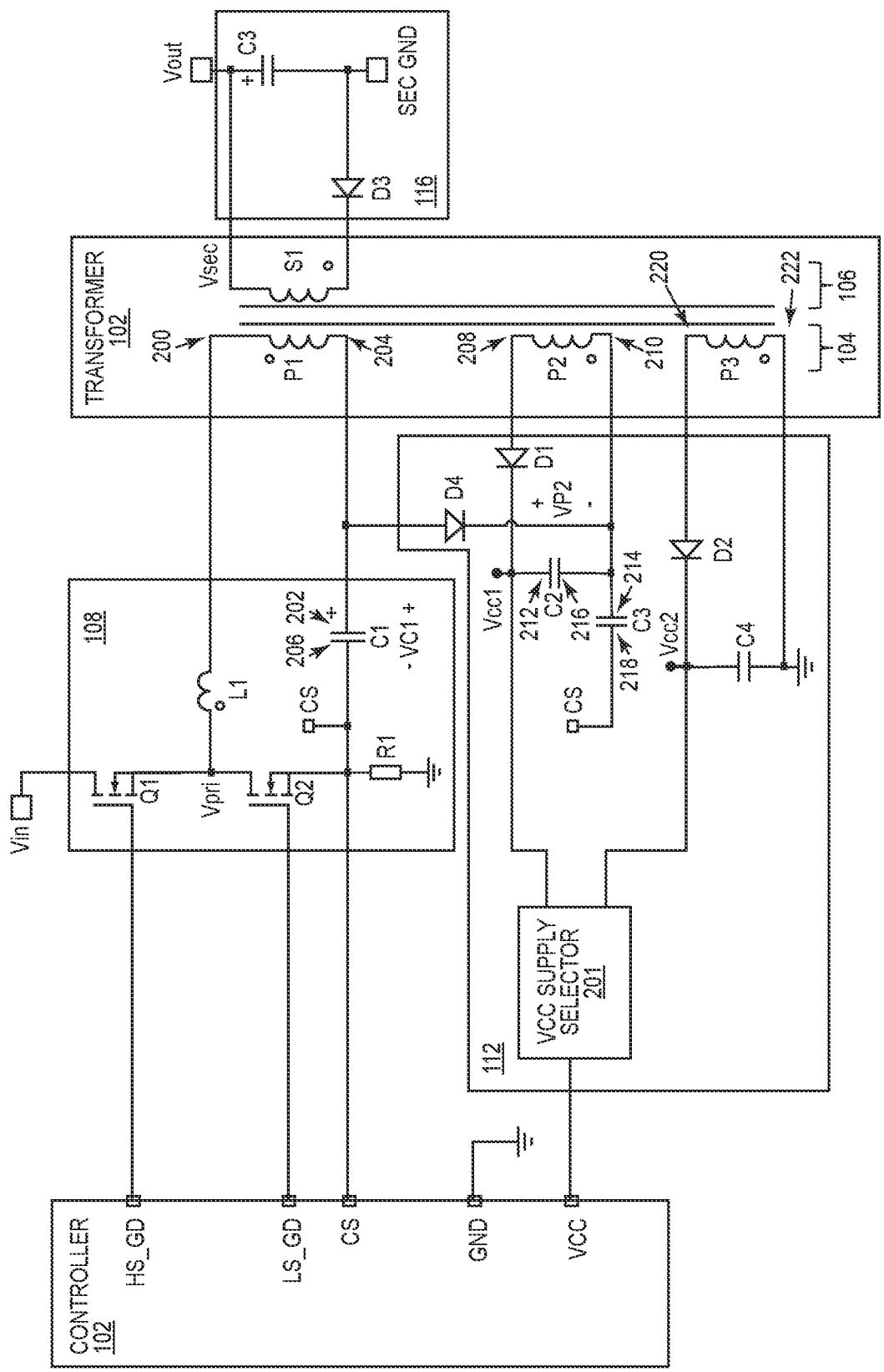

FIG. 4 illustrates another embodiment of the voltage supply circuit 112 of the isolated power converter 100. The embodiment shown in FIG. 4 is similar to the embodiment shown in FIG. 3. In FIG. 4, the second terminal 206 of the resonant capacitor C1 is electrically connected to ground by a current sense resistor R1 and the second terminal 218 of the second smoothing capacitor C3 is electrically connected to a node 'CS' between the current sense resistor R1 and the second terminal 206 of the resonant capacitor C1. In this configuration, the resonant capacitor C1 is connected to the current sense resistor R1 instead of directly connected to ground and the second smoothing capacitor C3 is connected on top of the current sense resistor R1 at the CS node.

For current mode control, the current sense resistor R1 may be used to detect the peak current on the primary winding P1. The voltage across the current sense resistor R1 reflects the current in the primary winding P1 and is relatively low (e.g., about 200 mV) and therefore does not adversely impact the much higher controller supply voltage Vcc when the voltage supply selector 201 selects the first voltage Vcc1 as the controller supply voltage Vcc.

Figure 5:
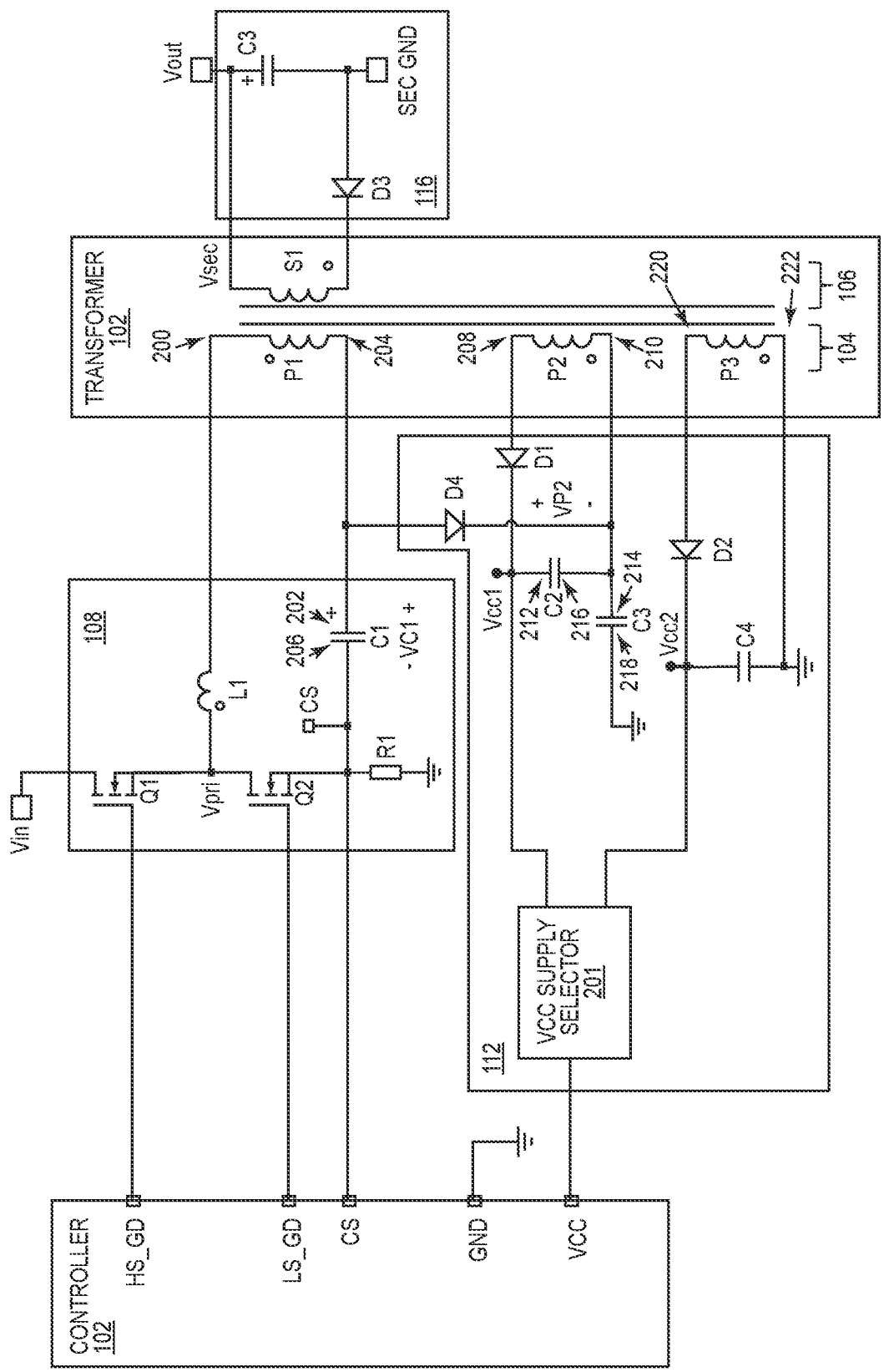

FIG. 5 illustrates another embodiment of the voltage supply circuit 112 of the isolated power converter 100. The embodiment shown in FIG. 5 is similar to the embodiment shown in FIG. 4. In FIG. 5, the second terminal 218 of the second smoothing capacitor C3 is directly connected to ground.

Figure 6:
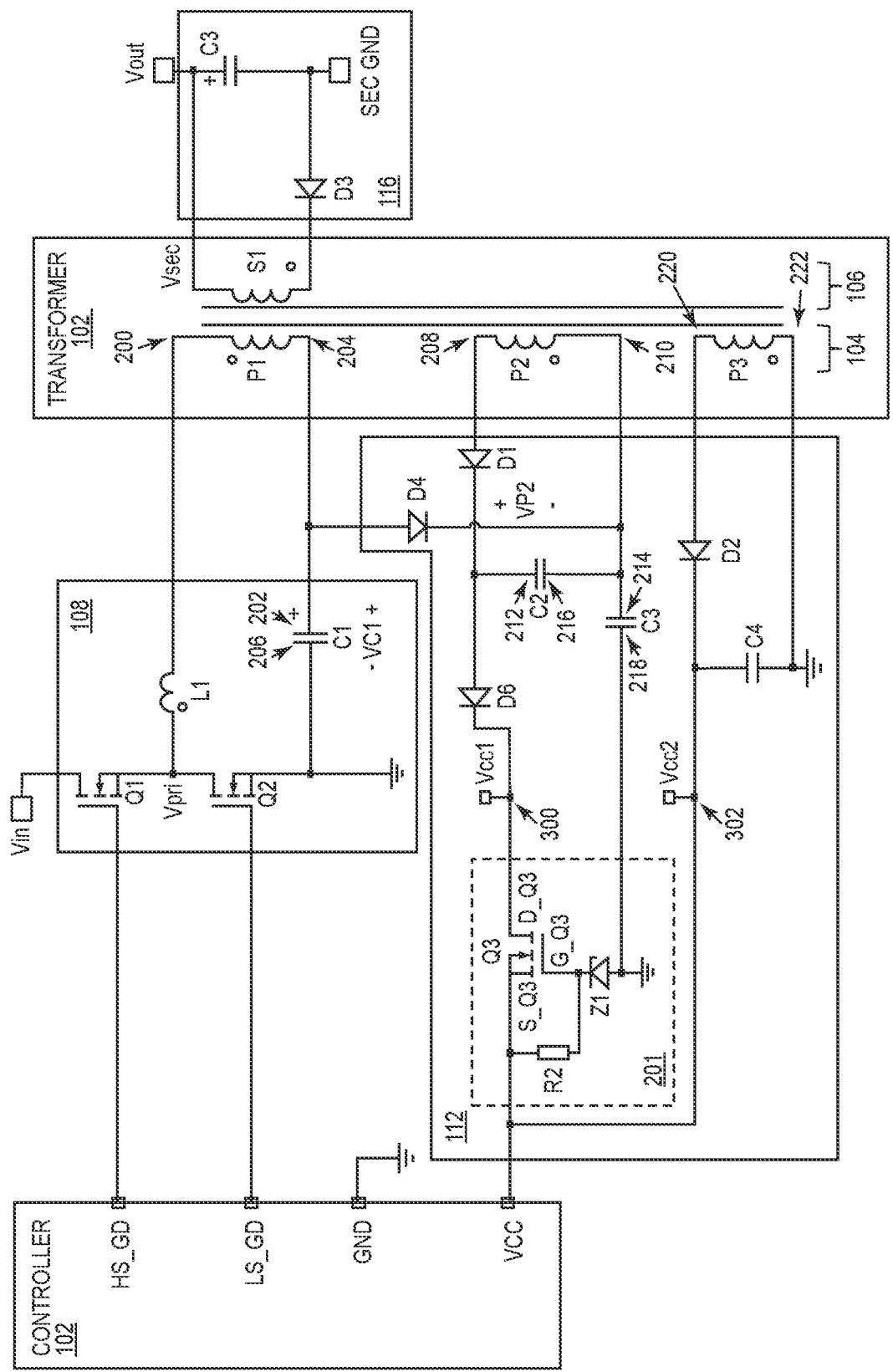

FIG. 6 illustrates another embodiment of the voltage supply circuit 112 of the isolated power converter 100. The embodiment shown in FIG. 6 is similar to the embodiment shown in FIG. 3. In FIG. 6, the voltage supply selector 201 includes a depletion mode transistor Q3 and a Zener diode Z1. The depletion mode transistor Q3 has a drain D Q3 electrically connected to a node 300 at the first voltage Vcc1 and a source S Q3 electrically connected to the power supply input VCC of the controller 102. The Zener diode Z1 has a cathode electrically connected to the gate G Q3 of the depletion mode transistor Q3 and an anode electrically connected to the second terminal 218 of the second smoothing capacitor C3. A resistor R2 connects the gate G Q3 of the depletion mode transistor Q3 to the source S Q3 of the depletion mode transistor Q3.

The Zener diode Z1 turns off the depletion mode transistor Q3 if the voltage proportional to the secondary side voltage Vsec is at the second level. A node 302 at the second voltage Vcc2 is electrically connected to the power supply input VCC of the controller 102, such that the supply voltage Vcc for the controller 102 is determined by the first voltage Vcc1 if the depletion mode transistor Q3 is on and determined by the second voltage Vcc2 if the depletion mode transistor Q3 is off. In one embodiment, the depletion mode transistor Q3 is a normally-on GaN transistor. The second terminal 206 of the resonant capacitor C1 may be directly connected to ground as shown in FIG. 6, or instead may be electrically connected to ground by a current sense resistor R1, e.g., as shown in FIGS. 4 and 5. The second terminal 218 of the second smoothing capacitor C3 may be directly connected to ground as shown in FIG. 6, or instead may be electrically connected to a node CS between the current sense resistor R1 and the second terminal 206 of the resonant capacitor C1, e.g., as shown in FIG. 5.

The depletion mode transistor Q3, resistor R2, and Zener diode Z1 collectively function as the voltage supply selector 201 for the controller 102, and as a linear regulator to limit the voltage of the first voltage Vcc1. For higher output voltages, bias comes from the second voltage Vcc2, while the first voltage Vcc1 is not connected to the controller 102 because the depletion mode transistor Q3 is off. The Vcc2 biasing of the controller 102 occurs when the second voltage Vcc2 is sufficiently higher than the diode voltage of the Zener diode Z1 to produce a sufficient source-to-gate voltage that turns off the depletion mode transistor Q3, thereby disconnecting the first voltage Vcc1 from the controller 102. This operation is similar to the operation that occurs in FIGS. 2 and 3, such that when the output voltage Vout decreases, e.g., to 9V or lower, the second voltage Vcc2 also decreases and is no longer high enough to keep the depletion mode transistor Q3 in the off state. Under these conditions, the depletion mode transistor Q3 turns on and the first voltage Vcc1 takes over as the supply voltage Vcc for the controller 102.

The voltage supply circuit 112 embodiment illustrated in FIG. 6 may be used in any of FIGS. 1 through 5. More generally, the isolated power converter 100 may be implemented as another type of isolated power converter such as a forward converter, push-pull converter, half bridge converter, full bridge converter, single-ended primary-inductor converter (SEPIC), Cuk converter, etc. instead of a flyback converter. The embodiments illustrated in FIGS. 2 through 6 in the context of a flyback converter may be readily adapted to forward converters, push-pull converters, half bridge converters, full bridge converters, SEPICs, Cuk converters, etc. without departing from the spirit of the invention.

Although the present disclosure is not so limited, the following numbered examples demonstrate one or more aspects of the disclosure.

Example 1

An isolated power converter, comprising: a transformer comprising a primary winding, a first auxiliary winding, and a second auxiliary winding each on a primary side of the transformer; a converter stage configured to convert a DC input for driving the primary winding of the transformer, the converter stage comprising a resonant capacitor electrically connected to the primary winding; a controller configured to control switching of the converter stage; and a voltage supply circuit configured to select a first voltage as a supply voltage for the controller if a voltage proportional to a secondary side voltage of the transformer is at a first level or select a second voltage as the supply voltage if the voltage proportional to the secondary side voltage is at a second level greater than the first level, wherein the first voltage corresponds to a summation of a voltage across the first auxiliary winding and a voltage across the resonant capacitor, wherein the second voltage corresponds to a voltage across the second auxiliary winding.

Example 2

The isolated power converter of example 1, wherein the converter stage is a flyback stage that comprises a high-side switch, a low-side switch, and a resonant tank circuit, wherein the resonant tank comprises the resonant capacitor and an inductor, wherein the high-side switch and the low-side switch are connected in series between the DC input and ground, wherein a switching node between the high-side switch and the low-side switch is electrically connected to a first terminal of the primary winding by the inductor, and wherein a second terminal of the primary winding is electrically connected to the resonant capacitor.

Example 3

The isolated power converter of example 2, wherein the voltage supply circuit comprises: a first smoothing capacitor; a second smoothing capacitor; a first diode; and a voltage supply selector, wherein an anode of the first diode is electrically connected to a first terminal of the first auxiliary winding and a cathode of the first diode is electrically connected to the voltage supply selector, wherein a first terminal of the resonant capacitor is electrically connected to both a second terminal of the first auxiliary winding and the second terminal of the primary winding and a second terminal of the resonant capacitor is electrically connected to ground, wherein both a first terminal of the first smoothing capacitor and a first terminal of the second smoothing capacitor are electrically connected to the cathode of the first diode, wherein a second terminal of the first smoothing capacitor is electrically connected to the second terminal of the first auxiliary winding.

Example 4

The isolated power converter of example 3, wherein the second terminal of the resonant capacitor is electrically connected to ground by a current sense resistor, and wherein a second terminal of the second smoothing capacitor is electrically connected to a node between the current sense resistor and the second terminal of the resonant capacitor.

Example 5

The isolated power converter of example 3, wherein the second terminal of the resonant capacitor is electrically connected to ground by a current sense resistor, and wherein a second terminal of the second smoothing capacitor is directly connected to ground.

Example 6

The isolated power converter of any of examples 3 through 5, wherein the voltage supply selector comprises: a depletion mode transistor having a drain electrically connected to a node at the first voltage and a source electrically connected to a power supply input of the controller; and a Zener diode having a cathode electrically connected to a gate of the depletion mode transistor and an anode electrically connected to a second terminal of the second smoothing capacitor, wherein the Zener diode is configured to turn off the depletion mode transistor if the voltage proportional to the secondary side voltage is at the second level, wherein a node at the second voltage is electrically connected to the power supply input of the controller, such that the supply voltage for the controller is determined by the first voltage if the depletion mode transistor is on and determined by the second voltage if the depletion mode transistor is off.

Example 7

The isolated power converter of example 6, wherein the depletion mode transistor is a normally-on GaN transistor.

Example 8

The isolated power converter of any of examples 2 through 7, wherein the voltage supply circuit comprises: a first smoothing capacitor; a second smoothing capacitor; a first diode; a second diode; and a voltage supply selector, wherein an anode of the first diode is electrically connected to a first terminal of the first auxiliary winding and a cathode of the first diode is electrically connected to the voltage supply selector, wherein a first terminal of the resonant capacitor is electrically connected to the second terminal of the primary winding and a second terminal of the resonant capacitor is electrically connected to ground, wherein an anode of the second diode is electrically connected to the second terminal of the primary winding and a cathode of the second diode is electrically connected to a second terminal of the first auxiliary winding, wherein a first terminal of the first smoothing capacitor is electrically connected to the cathode of the first diode and a second terminal of the first smoothing capacitor is electrically connected to the second terminal of the first auxiliary winding, wherein a first terminal of the second smoothing capacitor is electrically connected to the second terminal of the first auxiliary winding.

Example 9

The isolated power converter of example 8, wherein the second terminal of the resonant capacitor is electrically connected to ground by a current sense resistor, and wherein a second terminal of the second smoothing capacitor is electrically connected to a node between the current sense resistor and the second terminal of the resonant capacitor.

Example 10

The isolated power converter of example 8, wherein the second terminal of the resonant capacitor is electrically connected to ground by a current sense resistor, and wherein a second terminal of the second smoothing capacitor is directly connected to ground.

Example 11

The isolated power converter of any of examples 8 through 10, wherein the voltage supply selector comprises: a depletion mode transistor having a drain electrically connected to a node at the first voltage and a source electrically connected to a power supply input of the controller; and a Zener diode having a cathode electrically connected to a gate of the depletion mode transistor and an anode electrically connected to a second terminal of the second smoothing capacitor, wherein the Zener diode is configured to turn off the depletion mode transistor if the voltage proportional to the secondary side voltage is at the second level, wherein a node at the second voltage is electrically connected to the power supply input of the controller, such that the supply voltage for the controller is determined by the first voltage if the depletion mode transistor is on and determined by the second voltage if the depletion mode transistor is off.

Example 12

The isolated power converter of example 11, wherein the depletion mode transistor is a normally-on GaN transistor.

Example 13

The isolated power converter of any of examples 2 through 7, wherein the voltage supply circuit comprises: a depletion mode transistor having a drain electrically connected to a node at the first voltage and a source electrically connected to a power supply input of the controller; and a Zener diode configured to turn off the depletion mode transistor if the voltage proportional to the secondary side voltage is at the second level, wherein a node at the second voltage is electrically connected to the power supply input of the controller, such that the supply voltage for the controller is determined by the first voltage if the depletion mode transistor is on and determined by the second voltage if the depletion mode transistor is off.

Example 14

The isolated power converter of example 13, wherein the depletion mode transistor is a normally-on GaN transistor.

Example 15

The isolated power converter of any of examples 2 through 7, wherein the voltage supply circuit comprises: a first smoothing capacitor; a first diode; and a voltage supply selector, wherein an anode of the first diode is electrically connected to a first terminal of the first auxiliary winding and a cathode of the first diode is electrically connected to the voltage supply selector, wherein a first terminal of the resonant capacitor is electrically connected to the second terminal of the primary winding and a second terminal of the resonant capacitor is electrically connected to ground, wherein a first terminal of the first smoothing capacitor is electrically connected to the cathode of the first diode, wherein a second terminal of the first smoothing capacitor is electrically connected to a second terminal of the first auxiliary winding.

Example 16

The isolated power converter of example 15, wherein the voltage supply circuit comprises: a depletion mode transistor having a drain electrically connected to a node at the first voltage and a source electrically connected to a power supply input of the controller; and a Zener diode electrically connected to a gate of the depletion mode transistor and configured to turn off the depletion mode transistor if the voltage proportional to the secondary side voltage is at the second level, wherein a node at the second voltage is electrically connected to the power supply input of the controller, such that the supply voltage for the controller is determined by the first voltage if the depletion mode transistor is on and determined by the second voltage if the depletion mode transistor is off.

Example 17

The isolated power converter of example 16, wherein the depletion mode transistor is a normally-on GaN transistor.

Example 18

The isolated power converter of any of examples 15 through 17, wherein an output voltage of the isolated power converter ranges from a minimum of 3.3V to a maximum of 24V, and wherein a turn ratio for the first auxiliary winding is less than 2.4.

Example 19

The isolated power converter of any of examples 15 through 18, wherein an output voltage of the isolated power converter ranges from a minimum of 3.3V to a maximum of 24V, wherein the first diode has a rated voltage of at most 100V, and wherein the first smoothing capacitor has a rated voltage of less than 100V.

Example 20

The isolated power converter of any of examples 1 through 19, wherein the first level is in a range of 3.3V to 9V, and wherein the second level is in a range of 10V to 24V.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An isolated power converter, comprising:
    a transformer comprising a primary winding, a first auxiliary winding, and a second auxiliary winding each on a primary side of the transformer;
    a converter stage configured to convert a DC input for driving the primary winding of the transformer, the converter stage comprising a resonant capacitor electrically connected to the primary winding;
    a controller configured to control switching of the converter stage; and
    a voltage supply circuit configured to select a first voltage as a supply voltage for the controller if a voltage proportional to a secondary side voltage of the transformer is at a first level or select a second voltage as the supply voltage if the voltage proportional to the secondary side voltage is at a second level greater than the first level,
    wherein the first voltage corresponds to a summation of a voltage across the first auxiliary winding and a voltage across the resonant capacitor,
    wherein the second voltage corresponds to a voltage across the second auxiliary winding.

2. The isolated power converter of claim 1, wherein the converter stage is a flyback stage that comprises a high-side switch, a low-side switch, and a resonant tank circuit, wherein the resonant tank comprises the resonant capacitor and an inductor, wherein the high-side switch and the low-side switch are connected in series between the DC input and ground, wherein a switching node between the high-side switch and the low-side switch is electrically connected to a first terminal of the primary winding by the inductor, and wherein a second terminal of the primary winding is electrically connected to the resonant capacitor.

3. The isolated power converter of claim 2, wherein the voltage supply circuit comprises:
    a first smoothing capacitor;
    a second smoothing capacitor;
    a first diode; and
    a voltage supply selector,
    wherein an anode of the first diode is electrically connected to a first terminal of the first auxiliary winding and a cathode of the first diode is electrically connected to the voltage supply selector,
    wherein a first terminal of the resonant capacitor is electrically connected to both a second terminal of the first auxiliary winding and the second terminal of the primary winding and a second terminal of the resonant capacitor is electrically connected to ground,
    wherein both a first terminal of the first smoothing capacitor and a first terminal of the second smoothing capacitor are electrically connected to the cathode of the first diode,
    wherein a second terminal of the first smoothing capacitor is electrically connected to the second terminal of the first auxiliary winding.

4. The isolated power converter of claim 3, wherein the second terminal of the resonant capacitor is electrically connected to ground by a current sense resistor, and wherein a second terminal of the second smoothing capacitor is electrically connected to a node between the current sense resistor and the second terminal of the resonant capacitor.

5. The isolated power converter of claim 3, wherein the second terminal of the resonant capacitor is electrically connected to ground by a current sense resistor, and wherein a second terminal of the second smoothing capacitor is directly connected to ground.

6. The isolated power converter of claim 3, wherein the voltage supply selector comprises:
    a depletion mode transistor having a drain electrically connected to a node at the first voltage and a source electrically connected to a power supply input of the controller; and
    a Zener diode having a cathode electrically connected to a gate of the depletion mode transistor and an anode electrically connected to a second terminal of the second smoothing capacitor,
    wherein the Zener diode is configured to turn off the depletion mode transistor if the voltage proportional to the secondary side voltage is at the second level,
    wherein a node at the second voltage is electrically connected to the power supply input of the controller, such that the supply voltage for the controller is determined by the first voltage if the depletion mode transistor is on and determined by the second voltage if the depletion mode transistor is off.

7. The isolated power converter of claim 6, wherein the depletion mode transistor is a normally-on GaN transistor.

8. The isolated power converter of claim 2, wherein the voltage supply circuit comprises:
    a first smoothing capacitor;
    a second smoothing capacitor;
    a first diode;
    a second diode; and
    a voltage supply selector,
    wherein an anode of the first diode is electrically connected to a first terminal of the first auxiliary winding and a cathode of the first diode is electrically connected to the voltage supply selector,
    wherein a first terminal of the resonant capacitor is electrically connected to the second terminal of the primary winding and a second terminal of the resonant capacitor is electrically connected to ground,
    wherein an anode of the second diode is electrically connected to the second terminal of the primary winding and a cathode of the second diode is electrically connected to a second terminal of the first auxiliary winding, wherein a first terminal of the first smoothing capacitor is electrically connected to the cathode of the first diode and a second terminal of the first smoothing capacitor is electrically connected to the second terminal of the first auxiliary winding, wherein a first terminal of the second smoothing capacitor is electrically connected to the second terminal of the first auxiliary winding.

9. The isolated power converter of claim 8, wherein the second terminal of the resonant capacitor is electrically connected to ground by a current sense resistor, and wherein a second terminal of the second smoothing capacitor is electrically connected to a node between the current sense resistor and the second terminal of the resonant capacitor.

10. The isolated power converter of claim 8, wherein the second terminal of the resonant capacitor is electrically connected to ground by a current sense resistor, and wherein a second terminal of the second smoothing capacitor is directly connected to ground.

11. The isolated power converter of claim 8, wherein the voltage supply selector comprises:
a depletion mode transistor having a drain electrically connected to a node at the first voltage and a source electrically connected to a power supply input of the controller; and
a Zener diode having a cathode electrically connected to a gate of the depletion mode transistor and an anode electrically connected to a second terminal of the second smoothing capacitor,
wherein the Zener diode is configured to turn off the depletion mode transistor if the voltage proportional to the secondary side voltage is at the second level,
wherein a node at the second voltage is electrically connected to the power supply input of the controller, such that the supply voltage for the controller is determined by the first voltage if the depletion mode transistor is on and determined by the second voltage if the depletion mode transistor is off.

12. The isolated power converter of claim 11, wherein the depletion mode transistor is a normally-on GaN transistor.

13. The isolated power converter of claim 1, wherein the voltage supply circuit comprises:
a depletion mode transistor having a drain electrically connected to a node at the first voltage and a source electrically connected to a power supply input of the controller; and
a Zener diode configured to turn off the depletion mode transistor if the voltage proportional to the secondary side voltage is at the second level,
wherein a node at the second voltage is electrically connected to the power supply input of the controller, such that the supply voltage for the controller is determined by the first voltage if the depletion mode transistor is on and determined by the second voltage if the depletion mode transistor is off.

14. The isolated power converter of claim 13, wherein the depletion mode transistor is a normally-on GaN transistor.

15. The isolated power converter of claim 1, wherein the voltage supply circuit comprises:
a first smoothing capacitor;
a first diode; and
a voltage supply selector,
wherein an anode of the first diode is electrically connected to a first terminal of the first auxiliary winding and a cathode of the first diode is electrically connected to the voltage supply selector,
wherein a first terminal of the resonant capacitor is electrically connected to the second terminal of the primary winding and a second terminal of the resonant capacitor is electrically connected to ground,
wherein a first terminal of the first smoothing capacitor is electrically connected to the cathode of the first diode,
wherein a second terminal of the first smoothing capacitor is electrically connected to a second terminal of the first auxiliary winding.

16. The isolated power converter of claim 15, wherein the voltage supply circuit comprises:
a depletion mode transistor having a drain electrically connected to a node at the first voltage and a source electrically connected to a power supply input of the controller; and
a Zener diode electrically connected to a gate of the depletion mode transistor and configured to turn off the depletion mode transistor if the voltage proportional to the secondary side voltage is at the second level,
wherein a node at the second voltage is electrically connected to the power supply input of the controller, such that the supply voltage for the controller is determined by the first voltage if the depletion mode transistor is on and determined by the second voltage if the depletion mode transistor is off.

17. The isolated power converter of claim 16, wherein the depletion mode transistor is a normally-on GaN transistor.

18. The isolated power converter of claim 15, wherein an output voltage of the isolated power converter ranges from a minimum of 3.3V to a maximum of 24V, and wherein a turn ratio for the first auxiliary winding is less than 2.4.

19. The isolated power converter of claim 15, wherein an output voltage of the isolated power converter ranges from a minimum of 3.3V to a maximum of 24V, wherein the first diode has a rated voltage of at most 100V, and wherein the first smoothing capacitor has a rated voltage of less than 100V.

20. The isolated power converter of claim 1, wherein the first level is in a range of 3.3V to 9V, and wherein the second level is in a range of 10V to 24V.

* * * * *